US010031881B1

United States Patent
Su

(10) Patent No.: US 10,031,881 B1
(45) Date of Patent: Jul. 24, 2018

(54) USB CONTROLLER WITH AUTOMATIC CLOCK GENERATION AND METHOD THEREOF

(71) Applicant: LYRA SEMICONDUCTOR INCORPORATED, Hsinchu County (TW)

(72) Inventor: Ming-Tang Su, Hsinchu County (TW)

(73) Assignee: LYRA SEMICONDUCTOR INCORPORATED, Hsinchu County (TW)

( * ) Notice: Subject to any disclaimer, the term of this patent is extended or adjusted under 35 U.S.C. 154(b) by 11 days.

(21) Appl. No.: 15/481,557

(22) Filed: Apr. 7, 2017

(30) Foreign Application Priority Data

Mar. 14, 2017 (TW) .............................. 106108233 A

(51) Int. Cl.
*G06F 13/42* (2006.01)
*G06F 13/36* (2006.01)

(52) U.S. Cl.
CPC .......... *G06F 13/4282* (2013.01); *G06F 13/36* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 7,356,111 B1* | 4/2008 | Dean | .................... | H03L 7/0996 327/156 |
| 7,493,510 B2* | 2/2009 | Sung | ........................ | G06F 1/04 327/156 |
| 7,602,254 B2* | 10/2009 | Sandner | .................... | H03L 7/23 327/147 |
| 8,868,956 B1* | 10/2014 | Kraipak | .................... | G06F 1/26 713/340 |
| 2002/0062457 A1* | 5/2002 | Kamihara | ................. | G06F 1/06 713/600 |
| 2009/0225990 A1* | 9/2009 | Miyagi | ................... | H03L 7/183 381/3 |
| 2015/0326232 A1* | 11/2015 | Rahbar | ................. | H03L 7/0991 327/156 |

* cited by examiner

*Primary Examiner* — Elias Mamo
(74) *Attorney, Agent, or Firm* — Lin & Associates Intellectual Property, Inc.

(57) ABSTRACT

A USB controller with automatic clock generation comprising: an oscillating generator is used for generating an initial clock; a first phase locked loop is used for receiving the initial clock and outputting a controller operating clock having a first frequency; a controller is used for detecting at least one universal serial bus device and outputting an initial frame signal having a second frequency; a second phase lock loop is used for receiving the initial frame signal and outputting a sync frame signal having the first frequency; a third phase lock loop for receiving the sync frame signal and outputting a stabilizing frame signal having the first frequency; and a multiplexer is used for receiving the controller operating clock and the stabilizing frame signal and transmitting the controller operating clock or the stabilizing frame signals to the controller.

10 Claims, 5 Drawing Sheets

USB CONTROLLER WITH AUTOMATIC CLOCK GENERATION AND METHOD THEREOF

CROSS-REFERENCE TO RELATED APPLICATION

The present application is based on, and claims priority form, Taiwan Patent Application No. 106108233, filed Mar. 14, 2017 the disclosure of which is hereby incorporated by reference herein in its entirety.

TECHNICAL FIELD

The technical field generally relates to a USB controller with automatic clock generation and method thereof.

BACKGROUND

The known personal digital electronic devices mostly use universal serial bus (Universal Serial Bus, USB) interface for data transmission. In general, the data is transferred to the USB device by the USB host. For the real-time data transmission and playback, data is damaged often due to the clock mismatch between the device and the host, resulting in errors. The clocks at the device must be synchronized with the clock at the host to maintain the correctness of data transmission.

To synchronize the USB device clock and the USB host clock, the traditional USB controller and the physical layer needs a clock meeting the specification of USB clock drifting to drive the digital circuit. Regardless of the use of external crystal oscillation or internal oscillation circuit, it is required to make the USB clock drifting to 500 ppm for high speed, and 2500 ppm for full speed. The simplest way is to use external crystal oscillation, but additional cost and PCB area will be used. On the other hand, extra calibration circuit and time will incur when using internal oscillation circuit.

The present invention provides a USB controller with automatic clock generation and method thereof, which can rapidly generate clocks required for the controller operation, and eliminate the use of external crystal oscillation and the internal oscillator calibration by synchronization and multiplexing signals, so as to satisfy USB specification, reduce production cost and reduce calibration time.

SUMMARY

To eliminate the aforementioned drawbacks, the present invention provides a USB controller with automatic clock generation and method thereof, which can rapidly generate clocks required for the controller operation, and eliminate the use of external crystal oscillation and the internal oscillator calibration by synchronization and multiplexing signal.

To achieve the aforementioned object, the present invention provides a USB controller with automatic clock generation, comprising: an oscillator, for generating an initial clock; a first phase locked loop (PLL), used for receiving the initial clock and outputting a controller operating clock having a first frequency; a controller, used for detecting at least one universal serial bus device and outputting an initial frame signal having a second frequency; a second phase lock loop (PLL), used for receiving the initial frame signal and outputting a sync frame signal having the first frequency; a third phase lock loop (PLL), for receiving the sync frame signal and outputting a stabilizing frame signal having the first frequency; and a multiplexer, used for receiving the controller operating clock and the stabilizing frame signal and transmitting the controller operating clock or the stabilizing frame signals to the controller; wherein the controller operating clock being obtained with frequency multiplication of the initial clock by the first PLL; the sync frame signal being obtained with frequency multiplication of the initial frame signal by the second PLL; and the stabilizing frame signal being obtained with jitter and noise filtering of the sync frame signal by the third PLL to make the stabilizing frame signal conforming to USB transmission specification.

When using the USB controller with automatic clock generation of the present invention, the controller starts with using the internal oscillator and the first PLL to start the operation; then by synchronizing the initial frame signal and filtering the jitter and noise by the third PLL so that the stabilizing frame signal conforms to the USB transmission specification. At this point, by synchronization and multiplexing signal, the clock required by the controller operation can be rapidly generated, without the external crystal oscillation and internal oscillator calibration so as to satisfy USB specification, reduce production cost and reduce calibration time.

Another embodiment of the present invention provides a method of USB controller with automatic clock generation, comprising the following steps: Step 1: using an oscillator to generate an initial clock; Step 2: using a first phase locked loop (PLL) for receiving the initial clock and outputting a controller operating clock having a first frequency; Step 3: using a multiplexer for receiving the controller operating clock and transmitting the controller operating clock to a controller; Step 4: using the controller for detecting at least one universal serial bus device and outputting an initial frame signal having a second frequency; Step 5: using a second phase lock loop (PLL) for receiving the initial frame signal and outputting a sync frame signal having the first frequency; Step 6: using a third phase lock loop (PLL) for receiving the sync frame signal and outputting a stabilizing frame signal having the first frequency; Step 7: using the multiplexer for receiving the stabilizing frame signal and transmitting the stabilizing frame signals to the controller; wherein the controller operating clock being obtained with frequency multiplication of the initial clock by the first PLL; the sync frame signal being obtained with frequency multiplication of the initial frame signal by the second PLL; and the stabilizing frame signal being obtained with jitter and noise filtering of the sync frame signal by the third PLL to make the stabilizing frame signal conforming to USB transmission specification.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
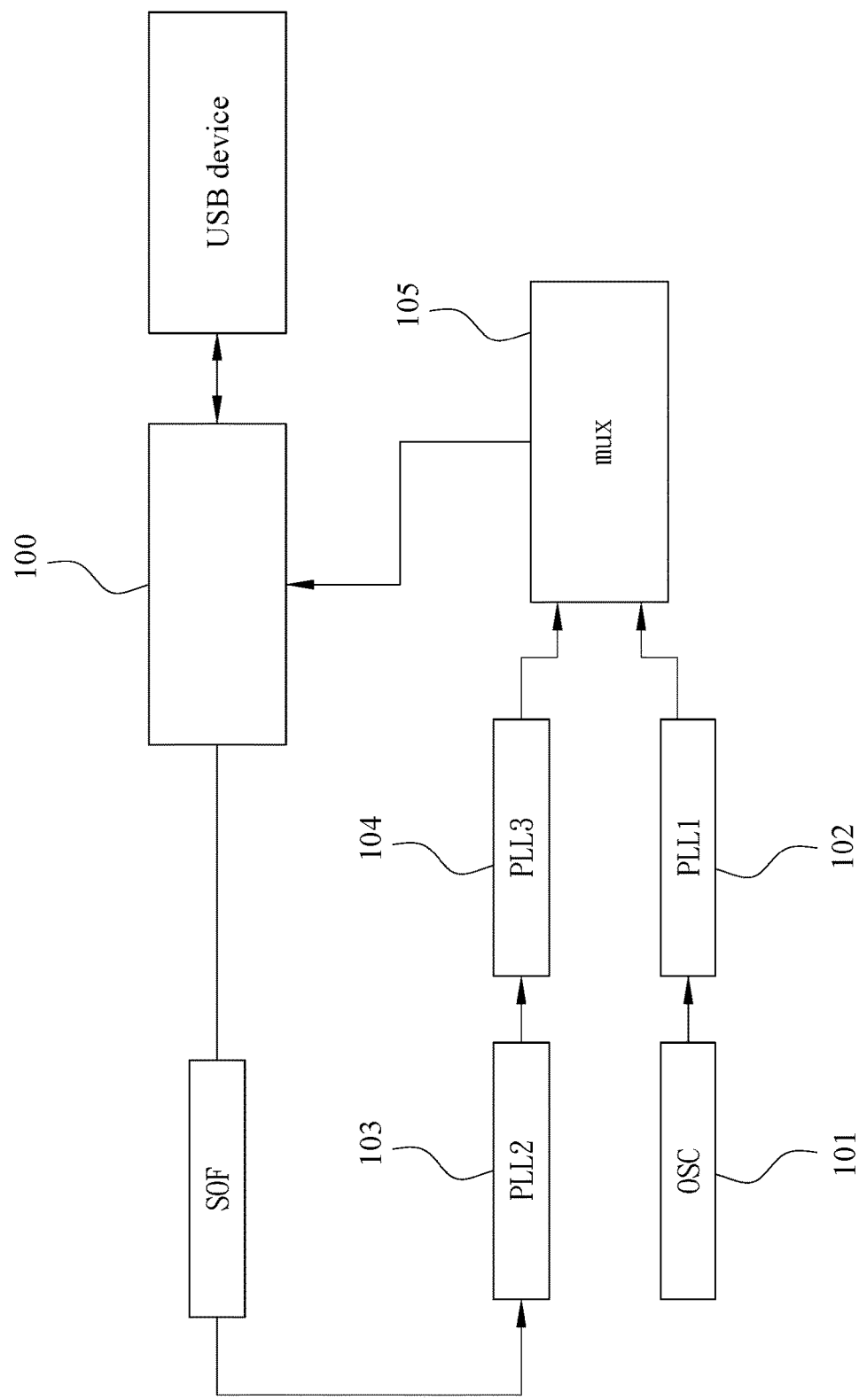
FIG. 1 shows a schematic view of the USB controller with automatic clock generation in accordance with an exemplary embodiment of the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The following uses an embodiment to describe a USB controller with automatic clock generation. FIG. 1 shows a schematic view of the USB controller with automatic clock generation in accordance with an exemplary embodiment. As shown in FIG. 1, the USB controller with automatic clock generation of the present invention comprises: an oscillator (OSC) 101, for generating an initial clock; a first phase locked loop (PLL1) 102, used for receiving the initial clock and outputting a controller operating clock having a first frequency; a controller 100, used for detecting at least one universal serial bus device and outputting an initial frame signal (SOF) having a second frequency; a second phase lock loop (PLL2) 103, used for receiving the initial frame signal (SOF) and outputting a sync frame signal having the first frequency; a third phase lock loop (PLL3) 104, for receiving the sync frame signal and outputting a stabilizing frame signal having the first frequency; and a multiplexer (mux) 105, used for receiving the controller operating clock and the stabilizing frame signal and transmitting the controller operating clock or the stabilizing frame signals to the controller 100; wherein the controller operating clock being obtained with frequency multiplication of the initial clock by the first PLL (PPL1) 102; the sync frame signal being obtained with frequency multiplication of the initial frame signal (SOF) by the second PLL (PPL2) 103; and the stabilizing frame signal being obtained with jitter and noise filtering of the sync frame signal by the third PLL (PLL3) 104 to make the stabilizing frame signal conforming to USB transmission specification.

Figure 2:
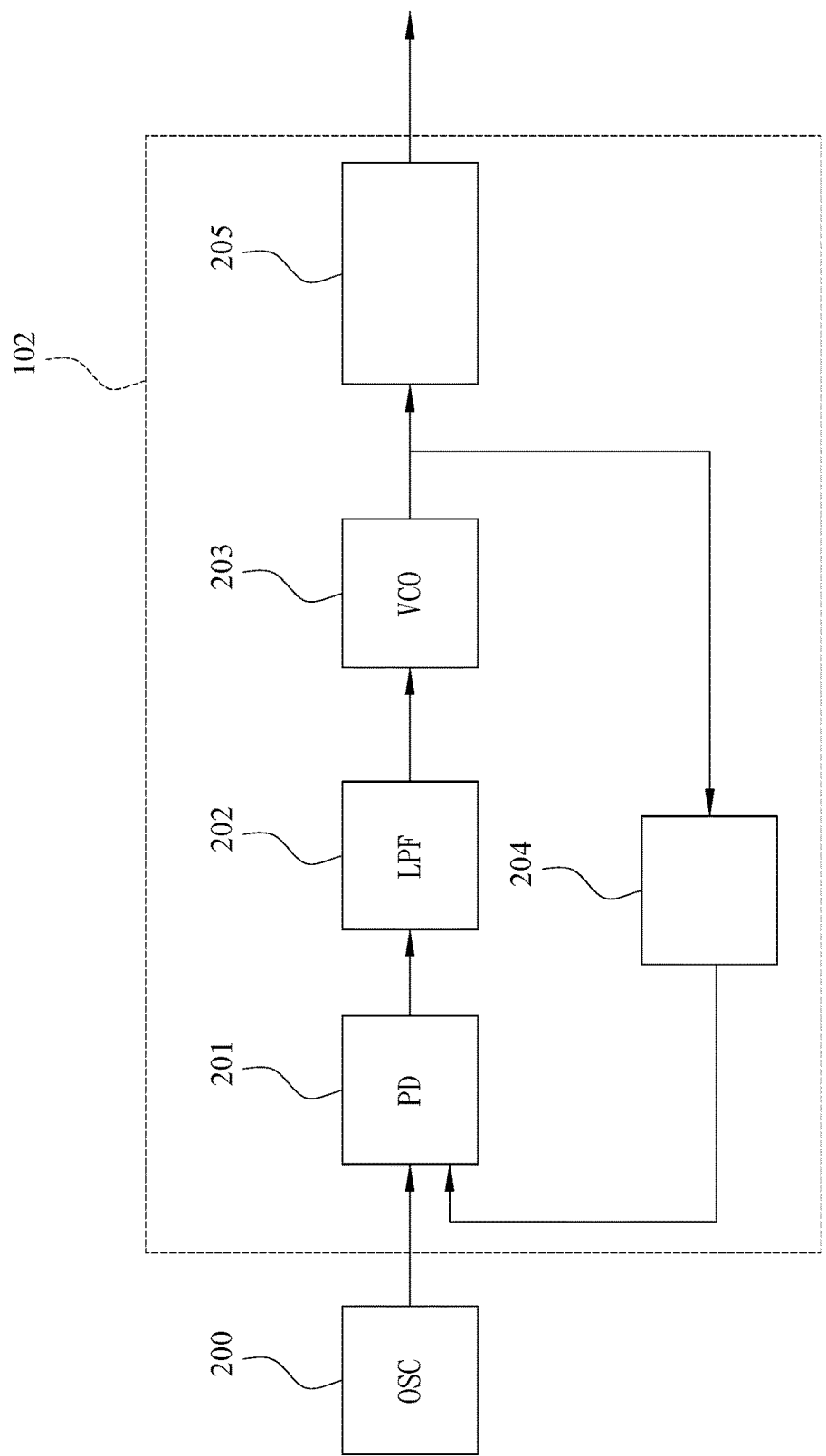
FIG. 2 shows a schematic view of the oscillator and the first PLL of the USB controller with automatic clock generation in accordance with an exemplary embodiment of the present invention.
Figure 4:
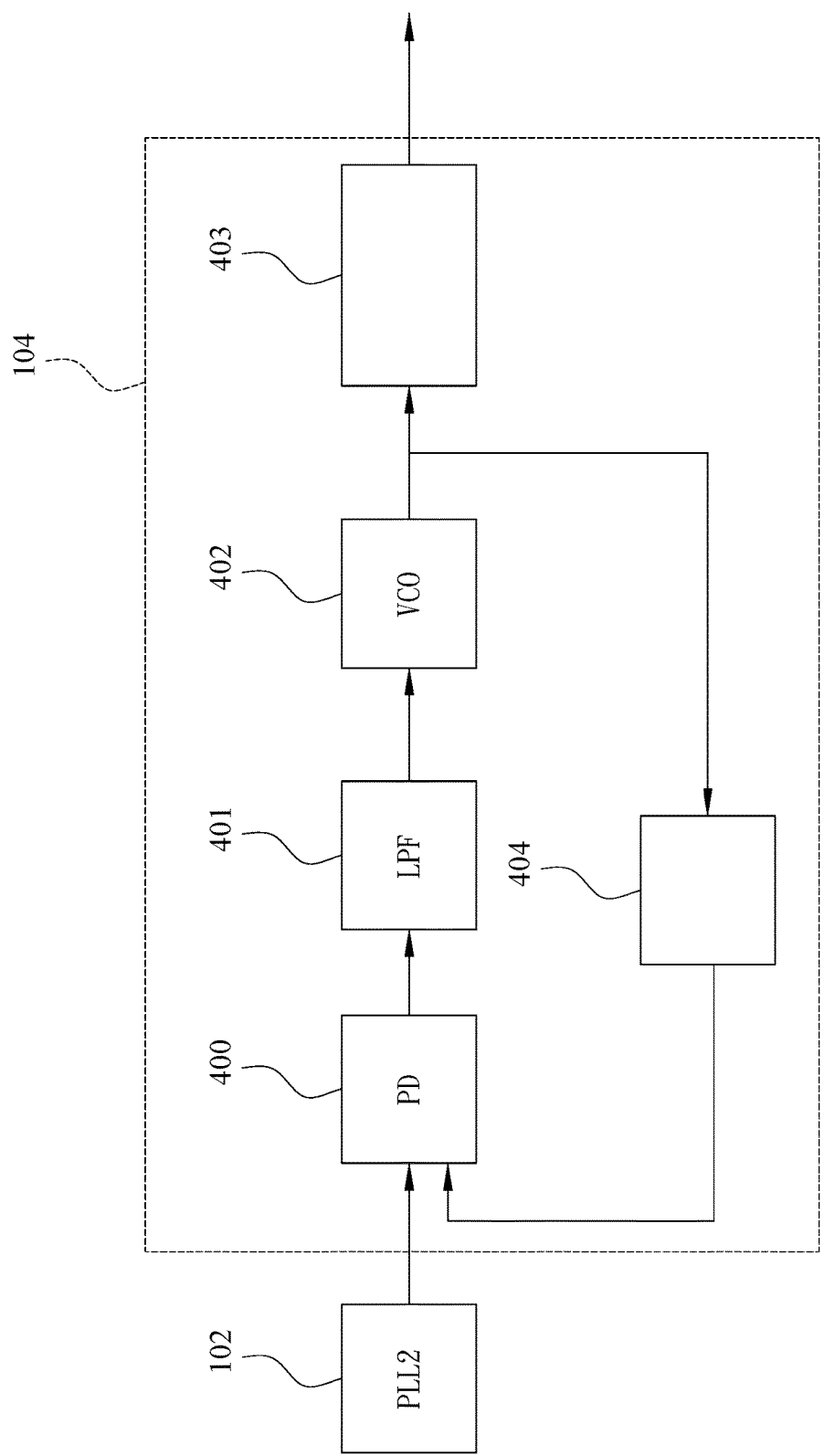
FIG. 4 shows a schematic view of the third PLL of the USB controller with automatic clock generation in accordance with an exemplary embodiment of the present invention.

Refer to FIG. 1, FIG. 2 and FIG. 4. The first PLL (PLL1) 102 and the third PLL (PLL3) 104 comprise respectively: a phase detector (PD) 201, 400, a low-pass filter (LPF) 202, 401, a voltage-controlled oscillator (VCO) 203, 402, a first frequency divider 205, 403, and a second frequency divider 204, 404.

Figure 3:
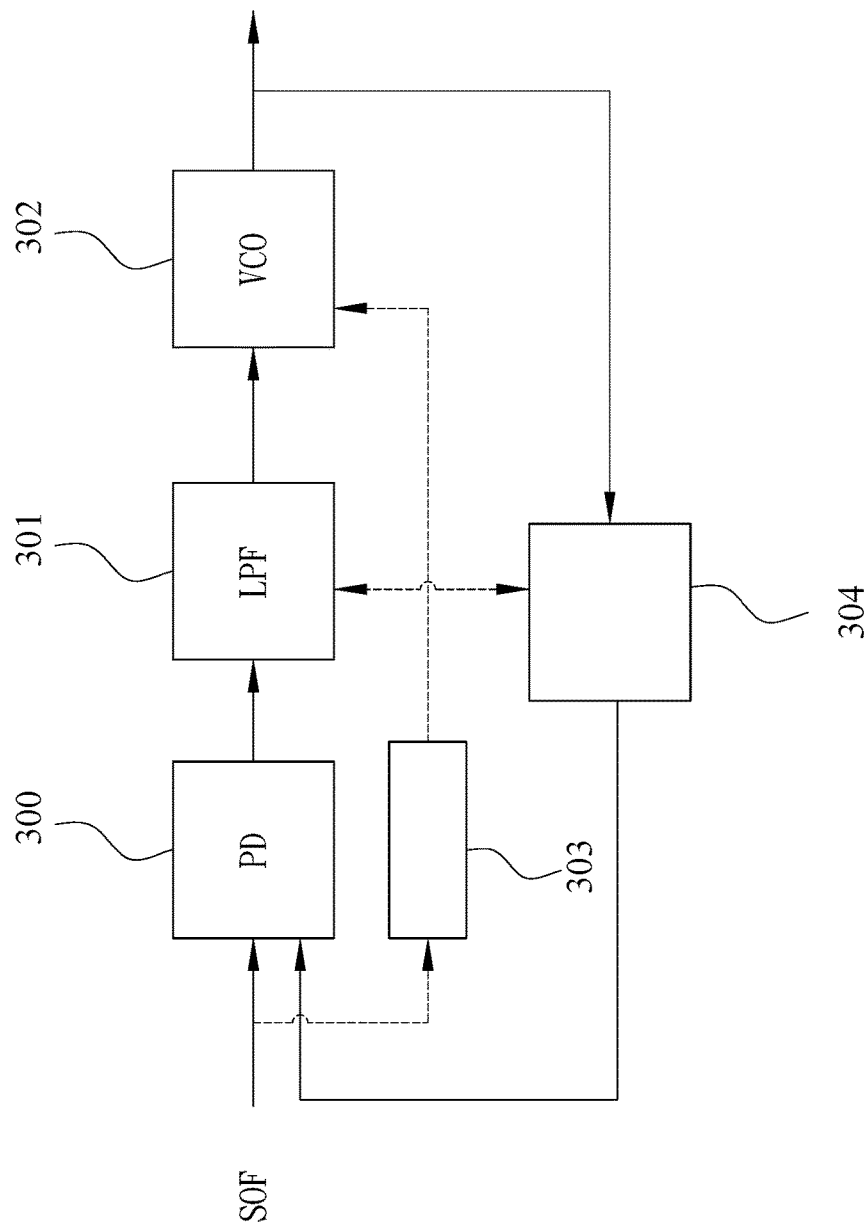
FIG. 3 shows a schematic view of the second PLL of the USB controller with automatic clock generation in accordance with an exemplary embodiment of the present invention.

Refer to FIG. 1 and FIG. 3. The second PLL (PLL2) 103 comprises: a phase detector (PD) 300, a low-pass filter (LPF) 301, a voltage-controlled oscillator (VCO) 302, a frame signal detector 303, and a frequency divider 304.

In the present embodiment, the oscillator (OSC) 101 generates an initial clock having the frequency of 12 MHz; then, the first PLL (PLL1) 102 raises the initial clock to the operating clock required by the controller 100, i.e., outputting a controller operating clock with a first frequency.

In the present embodiment, the LPF 301 of the second PLL (PLL2) 103 has a default value. When the frame signal detector 303 detects the first initial frame signal (SOF), the frame signal detector 303 will automatically calculate the required default value for the VCO 302 corresponding to the second PLL (PLL2) 103 and the third PLL (PLL3) 104 to have a complete initial frame signal (SOF), initializes the second PLL (PLL2) 103 and the third PLL (PLL3) 104, and activates the second PLL (PLL2) 103 and the third PLL (PLL3) 104 when the third initial frame signal (SOF) appears; as such, the third PLL (PLL3) 104 is able to output frequency stably with a small number of initial frame signals (SOF). The frame signal detector 303 controls the LPF 301 and the frequency divider 304 to start operating for synchronizing the initial frame signals (SOF).

Figure 5:
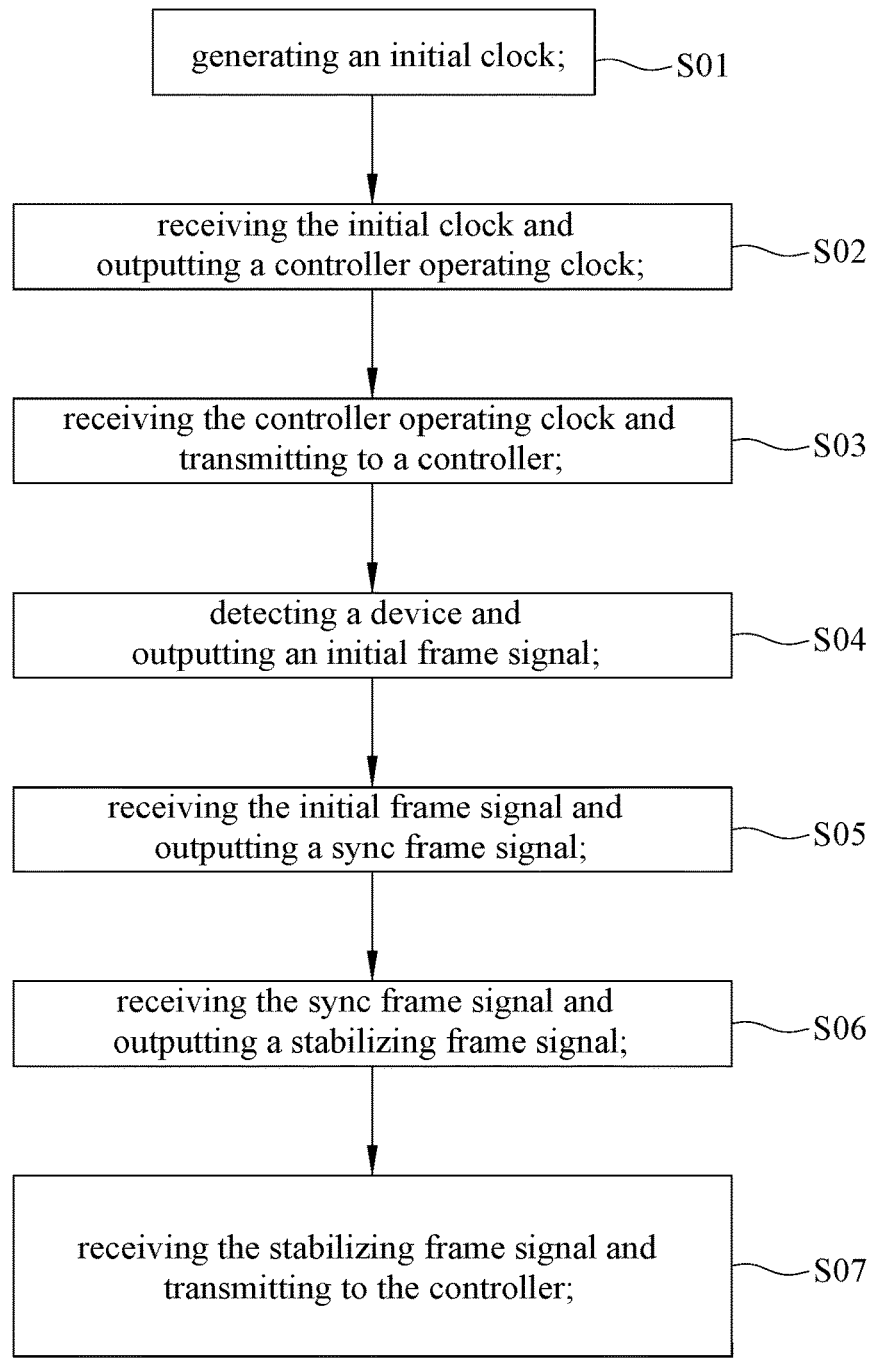
FIG. 5 shows a flowchart of the method of USB controller with automatic clock generation in accordance with an exemplary embodiment of the present invention.

Refer to FIG. 1 and FIG. 5. The USB control with automatic clock generation of the present invention operates in the following process: Step 1: using an oscillator (OSC) 101 to generate an initial clock (S01); Step 2: using a first phase locked loop (PLL1) 102 for receiving the initial clock and outputting a controller operating clock having a first frequency (S02); Step 3: using a multiplexer (mux) 105 for receiving the controller operating clock and transmitting the controller operating clock to a controller 100 (S03); Step 4: using the controller 100 for detecting at least one universal serial bus device and outputting an initial frame signal (SOF) having a second frequency (SO4); Step 5: using a second phase lock loop (PLL2) 103 for receiving the initial frame signal (SOF) and outputting a sync frame signal having the first frequency (S05); Step 6: using a third phase lock loop (PLL3) 104 for receiving the sync frame signal and outputting a stabilizing frame signal having the first frequency (S06); Step 7: using the multiplexer (mux) 105 for receiving the stabilizing frame signal and transmitting the stabilizing frame signals to the controller 100 (S07).

When using the USB controller with automatic clock generation of the present invention, the controller starts with using the internal oscillator (OSC) 101 and the first PLL (PLL1) 102 to start the operation; then by synchronizing the initial frame signal and filtering the jitter and noise by the third PLL (PLL3) 104 so that the stabilizing frame signal conforms to the USB transmission specification. At this point, by synchronization and multiplexing signal, the clock required by the controller operation can be rapidly generated, without the external crystal oscillation and internal oscillator calibration so as to satisfy USB specification, reduce production cost and reduce calibration time.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A USB controller with automatic clock generation, comprising:
    an oscillator, for generating an initial clock;
    a first phase locked loop (PLL), used for receiving the initial clock and outputting a controller operating clock having a first frequency;
    a controller, used for detecting at least one universal serial bus device and outputting an initial frame signal having a second frequency;
    a second phase lock loop (PLL), used for receiving the initial frame signal and outputting a sync frame signal having the first frequency;

a third phase lock loop (PLL), for receiving the sync frame signal and outputting a stabilizing frame signal having the first frequency; and a multiplexer, used for receiving the controller operating clock and the stabilizing frame signal and transmitting the controller operating clock or the stabilizing frame signals to the controller;

wherein the controller operating clock being obtained with frequency multiplication of the initial clock by the first PLL; the sync frame signal being obtained with frequency multiplication of the initial frame signal by the second PLL; and the stabilizing frame signal being obtained with jitter and noise filtering of the sync frame signal by the third PLL to make the stabilizing frame signal conforming to USB transmission specification;

wherein the second PLL comprising: a low-pass filter (LPF), a voltage-controlled oscillator (VCO), and a frame signal detector; the LPF of the second PLL having a default value; when the frame signal detector detecting a first initial frame signal (SOF), the frame signal detector automatically calculating the required default value for the VCO corresponding to the second PLL and the third PLL to have a complete initial frame signal (SOF), initializing the second PLL and the third PLL, and activating the second PLL and the third PLL when a third initial frame signal (SOF) appearing.

2. The USB controller with automatic clock generation as claimed in claim 1, wherein the initial clock is at 12 MHz.

3. The USB controller with automatic clock generation as claimed in claim 1, wherein the controller operating clock is between 48 MHz and 5 GHz.

4. The USB controller with automatic clock generation as claimed in claim 1, wherein the first PLL and the third PLL comprise respectively: a phase detector, a low-pass filter, a voltage-controlled oscillator, a first frequency divider, and a second frequency divider.

5. The USB controller with automatic clock generation as claimed in claim 1, wherein the second PLL further comprises: a phase detector, and a frequency divider.

6. A method of USB controller with automatic clock generation, comprising the steps of:

Step 1: using an oscillator to generate an initial clock; Step 2: using a first phase locked loop (PLL) for receiving the initial clock and outputting a controller operating clock having a first frequency; Step 3: using a multiplexer for receiving the controller operating clock and transmitting the controller operating clock to a controller; Step 4: using the controller for detecting at least one universal serial bus device and outputting an initial frame signal having a second frequency; Step 5: using a second phase lock loop (PLL) for receiving the initial frame signal and outputting a sync frame signal having the first frequency; Step 6: using a third phase lock loop (PLL) for receiving the sync frame signal and outputting a stabilizing frame signal having the first frequency; Step 7: using the multiplexer for receiving the stabilizing frame signal and transmitting the stabilizing frame signals to the controller; wherein the controller operating clock being obtained with frequency multiplication of the initial clock by the first PLL; the sync frame signal being obtained with frequency multiplication of the initial frame signal by the second PLL; and the stabilizing frame signal being obtained with jitter and noise filtering of the sync frame signal by the third PLL to make the stabilizing frame signal conforming to USB transmission specification; wherein the second PLL comprising: a low-pass filter (LPF), a voltage-controlled oscillator (VCO), and a frame signal detector; the LPF of the second PLL having a default value; when the frame signal detector detecting a first initial frame signal (SOF), the frame signal detector automatically calculating the required default value for the VCO corresponding to the second PLL and the third PLL to have a complete initial frame signal (SOF), initializing the second PLL and the third PLL, and activating the second PLL and the third PLL when a third initial frame signal (SOF) appearing.

7. The method of USB controller with automatic clock generation as claimed in claim 6, wherein the initial clock is at 12 MHz.

8. The method of USB controller with automatic clock generation as claimed in claim 6, wherein the controller operating clock is between 48 MHz and 5 GHz.

9. The method of USB controller with automatic clock generation as claimed in claim 6, wherein the first PLL and the third PLL comprise respectively: a phase detector, a low-pass filter, a voltage-controlled oscillator, a first frequency divider, and a second frequency divider.

10. The method of USB controller with automatic clock generation as claimed in claim 6, wherein the second PLL further comprises: a phase detector, and a frequency divider.

* * * * *